US012604798B2

(12) United States Patent
Liu

(10) Patent No.: US 12,604,798 B2
(45) Date of Patent: Apr. 21, 2026

(54) ROBOT GARDENING TOOL SYSTEM AND METHOD FOR ROBOT GARDENING TOOL

(71) Applicant: TECHTRONIC CORDLESS GP, Anderson, SC (US)

(72) Inventor: Heng Sheng Liu, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 768 days.

(21) Appl. No.: 17/948,683

(22) Filed: Sep. 20, 2022

(65) Prior Publication Data

US 2023/0101852 A1 Mar. 30, 2023

(30) Foreign Application Priority Data

Sep. 29, 2021 (CN) .......................... 202111151237.6

(51) Int. Cl.
A01D 34/00 (2006.01)
A01D 101/00 (2006.01)
(Continued)

(52) U.S. Cl.
CPC ........... *A01D 34/008* (2013.01); *G05D 1/247* (2024.01); *A01D 2101/00* (2013.01); *G05D 2107/23* (2024.01)

(58) Field of Classification Search
CPC .. A01D 34/008; A01D 2101/00; G05D 1/247; G05D 2107/23
See application file for complete search history.

(56) References Cited

U.S. PATENT DOCUMENTS 5,504,416 A 4/1996 Holloway
5,973,497 A 10/1999 Bergk
(Continued)

FOREIGN PATENT DOCUMENTS

CN 201303255 Y 9/2009
CN 101604773 B 12/2009
(Continued)

OTHER PUBLICATIONS

European Search Report Corresponding with Application No. EP22194950 on Jan. 27, 2023 (2 pages).
(Continued)

*Primary Examiner* — Michael J Zanelli
(74) *Attorney, Agent, or Firm* — Dority & Manning, P.A.

(57) ABSTRACT

The present invention provides a robot gardening tool system and a method for a robot gardening tool. The robot gardening tool system comprises a robot gardening tool and a boundary module. The boundary module delimits a work area and/or a non-work area of the robot gardening tool, and the boundary module comprises at least one boundary element. The robot gardening tool comprises a boundary detection apparatus, a jamming detection apparatus and a control apparatus. The boundary detection apparatus detects the at least one boundary element; the jamming detection apparatus judges whether the robot gardening tool is jammed based on a feedback signal $S_i$ of the boundary detection apparatus; and the control apparatus controls the robot gardening tool to perform an extrication operation when the robot gardening tool is jammed. The present invention also provides a method for a robot gardening tool. The robot gardening tool system and method for a robot gardening tool according to the present invention enable effective detection of jamming, reduce misjudgements, and can perform effective operations on work areas where jamming is likely.

20 Claims, 4 Drawing Sheets

(51) Int. Cl.
  G05D 1/247  (2024.01)
  G05D 107/20  (2024.01)

(56)  References Cited

U.S. PATENT DOCUMENTS

| | | |
|---|---|---|
| 6,133,713 A | 10/2000 | Brotto |
| 6,172,487 B1 | 1/2001 | Brotto |
| 6,373,228 B1 | 4/2002 | Sakakibara |
| 6,696,819 B2 | 2/2004 | Bertness |
| 6,826,895 B2 | 12/2004 | Iida |
| 6,992,464 B2 | 1/2006 | Takano |
| 7,301,306 B2 | 11/2007 | Zhang |
| 7,656,130 B2 | 2/2010 | Sakakibara |
| 8,129,955 B2 | 3/2012 | White |
| 8,940,427 B2 | 1/2015 | Noda |
| 9,276,419 B2 | 3/2016 | Borinato |
| 9,356,464 B2 | 5/2016 | Tomiyasu |
| 9,778,321 B2 | 10/2017 | Umemura |
| 9,804,034 B2 | 10/2017 | Jefferies |
| 10,105,838 B2 | 10/2018 | Mou |
| 10,377,035 B2 | 8/2019 | He |
| 10,483,791 B2 | 11/2019 | Mergener et al. |
| 10,724,926 B2 | 7/2020 | Chen |
| 10,804,574 B2 | 10/2020 | Clarke |
| 10,821,854 B2 | 11/2020 | Ito |
| 10,850,622 B2 | 12/2020 | Matsuda |
| 10,855,089 B2 | 12/2020 | Kobayakawa |
| 11,005,283 B2 | 5/2021 | Cruz |
| 11,016,481 B2 | 5/2021 | Gustavsson |
| 2002/0000789 A1 | 1/2002 | Haba |
| 2005/0034437 A1 | 2/2005 | McMurtry |
| 2005/0077878 A1 | 4/2005 | Carrier et al. |
| 2010/0090652 A1 | 4/2010 | Takeda et al. |
| 2011/0202175 A1 | 8/2011 | Romanov |
| 2012/0029752 A1* | 2/2012 | Johnson ................ G05D 1/027 |
| | | 901/1 |
| 2012/0256752 A1 | 10/2012 | Musser |
| 2015/0366130 A1 | 12/2015 | Bergström et al. |
| 2016/0014955 A1 | 1/2016 | Hans |
| 2019/0156595 A1 | 5/2019 | Manji |
| 2020/0163275 A1 | 5/2020 | Zhao |
| 2020/0203968 A1 | 6/2020 | Okabayashi |
| 2020/0203969 A1 | 6/2020 | Truettner et al. |
| 2020/0212515 A1 | 7/2020 | King |
| 2020/0212838 A1 | 7/2020 | Nakamoto |
| 2021/0089034 A1 | 3/2021 | Hjelmaker |
| 2021/0098832 A1 | 4/2021 | Kobayakawa |
| 2021/0263521 A1 | 8/2021 | Kameyama et al. |

FOREIGN PATENT DOCUMENTS

| | | |
|---|---|---|
| CN | 104953198 A | 9/2015 |
| CN | 106602626 A | 4/2017 |
| CN | 206148579 U | 5/2017 |
| CN | 107593088 A | 1/2018 |
| CN | 109038756 A | 12/2018 |
| CN | 109494857 A | 3/2019 |
| CN | 109673240 A | 4/2019 |
| CN | 109995096 A | 7/2019 |
| CN | 110311183 A | 10/2019 |
| CN | 209609208 U | 11/2019 |
| CN | 111165156 A | 5/2020 |
| CN | 111602315 A | 8/2020 |
| CN | 207075240 U | 8/2020 |
| CN | 111509804 A | 1/2021 |
| CN | 212304796 U | 1/2021 |
| CN | 112425345 A | 3/2021 |
| CN | 112600284 A | 4/2021 |
| CN | 112600289 A | 4/2021 |
| DE | 202019101019 U1 | 3/2019 |
| EP | 0609229 A1 | 8/1994 |
| EP | 2048933 B1 | 4/2009 |
| EP | 2412221 A2 | 2/2012 |
| EP | 3327889 A1 | 5/2018 |
| EP | 3528213 A1 | 8/2019 |
| EP | 3580810 B1 | 12/2019 |
| WO | WO2014050152 A1 | 4/2014 |
| WO | WO2019031273 A1 | 2/2019 |
| WO | WO2019144916 A1 | 8/2019 |
| WO | WO2020214925 A1 | 10/2020 |
| WO | WO2021087390 A1 | 5/2021 |
| WO | WO2021115869 A1 | 6/2021 |
| WO | WO2021132420 A1 | 7/2021 |
| WO | WO2021132421 A1 | 7/2021 |

OTHER PUBLICATIONS

European Search Report Corresponding with Application No. EP22186325 on Dec. 9, 2022 (2 pages).

* cited by examiner robot gardening tool 300 boundary detection apparatus 310 signal receiving module 312 collision sensor 314 jamming detection apparatus 320 control apparatus 340 trajectory recording apparatus 330 boundary module 360 boundary element 362 signal generating unit 364 p1(S₁,t₁)

p2(S₂,t₂)

400 a b

409 c d p3(S₃,t₃)

e f p4

42

401

42b

403

42a

405

402

407

44

ROBOT GARDENING TOOL SYSTEM AND METHOD FOR ROBOT GARDENING TOOL

This application claims the benefit of priority to Chinese Patent Application No. CN 202111151237.6, filed on Sep. 29, 2021, the disclosure of which is incorporated by reference herein in its entirety.

TECHNICAL FIELD

The present invention relates to the field of gardening tools, in particular to a robot gardening tool system and a method for a robot gardening tool, and more specifically to a grass-cutting robot and a method for controlling same.

BACKGROUND ART

As technology develops, robot gardening tools are being used ever more widely. Robot gardening tools can work by themselves, e.g. cut grass, in a predetermined work area without the need for user intervention. This not only saves manpower but also allows the user to have more free time.

However, robot gardening tools are likely to encounter problems in the course of working. For example, the physical conditions in the work area might not be ideal, e.g. there might be narrow or restricted areas, or road conditions that the robot gardening tool struggles to overcome. These physical conditions will result in the robot gardening tool becoming jammed in the course of working, and thereby being unable to continue to complete the work. In an existing system, human intervention might be needed to disengage the tool from its jammed state, before letting it continue to work on its own. However, this requires human participation and prolongs the time needed to complete the work, so is undesirable.

SUMMARY OF THE INVENTION

In response to one or more deficiencies in the prior art, the present invention provides a robot gardening tool system and a method for a robot gardening tool.

According to one aspect of the present invention, a robot gardening tool system is provided. The robot gardening tool system comprises a robot gardening tool and a boundary module. The boundary module delimits a work area and/or a non-work area of the robot gardening tool, and the boundary module comprises at least one boundary element defining a periphery of the work area and/or the non-work area. The robot gardening tool comprises a boundary detection apparatus, a jamming detection apparatus and a control apparatus. The boundary detection apparatus is configured to detect the at least one boundary element; the jamming detection apparatus communicates with the boundary detection apparatus and is configured to judge whether the robot gardening tool is jammed based on a feedback signal $S_i$ of the boundary detection apparatus; and the control apparatus is configured to control the robot gardening tool to perform an extrication operation when the robot gardening tool is jammed.

Alternatively or additionally, the boundary module comprises a signal generating unit, which generates an excitation signal and sends the excitation signal to the at least one boundary element, and the boundary element comprises a boundary line which generates a boundary signal upon receiving the excitation signal, the boundary signal for example being an electromagnetic field. At least one boundary comprises a physical boundary such as a fence, wall, etc.

Alternatively or additionally, the boundary detection apparatus comprises a signal receiving module for sensing the boundary signal, and the boundary detection apparatus issues the feedback signal $S_i$ when the strength of the boundary signal sensed by the signal receiving module is greater than a strength threshold.

Alternatively or additionally, the boundary detection apparatus comprises a collision sensor such as an accelerometer, and the boundary detection apparatus issues the feedback signal $S_i$ when the collision sensor senses that the robot gardening tool has collided with the at least one boundary.

Alternatively or additionally, the jamming detection apparatus receives the feedback signal $S_i$, records a time of occurrence $t_i$ of each feedback signal $S_i$, and calculates a time interval $\Delta t_i$ between two consecutive feedback signals $S_i$ and $S_{i+1}$, and the jamming detection apparatus is configured to judge whether the robot gardening tool is jammed based on the time interval $\Delta t_i$.

Alternatively or additionally, the jamming detection apparatus determines that the robot gardening tool is jammed when the time interval $\Delta t_i$ is less than a time threshold.

Alternatively or additionally, the jamming detection apparatus determines that the robot gardening tool is jammed when n consecutive time intervals $\Delta t_i$, $\Delta t_{i+1}$ ... $\Delta t_{i+n-1}$ are all less than a time threshold, wherein n is for example selected from one of 2-10.

Alternatively or additionally, the jamming detection apparatus determines that the robot gardening tool is jammed when m time intervals of n consecutive time intervals $\Delta t_i$, $\Delta t_{i+1}$ ... $\Delta t_{i+n-1}$ are all less than a time threshold, wherein n is for example selected from one of 2-10, m is for example selected from one of 2-9, and m<n.

Alternatively or additionally, the robot gardening tool further comprises a trajectory recording apparatus, which records a trajectory of advance of the robot gardening tool, and the extrication operation comprises causing the robot gardening tool to retreat along the recorded trajectory of advance for a predetermined time or a predetermined distance, and preferably then turn aside through a predetermined angle.

Alternatively or additionally, the extrication operation comprises causing the robot gardening tool to advance along the at least one boundary element for a predetermined time or a predetermined distance, and then turn aside through a predetermined angle. Optionally, the predetermined time is a random time, and the predetermined angle is a random angle.

Alternatively or additionally, the control apparatus is configured to issue an alert to a user when jamming of the robot gardening tool is detected again within a period of time after completion of the extrication operation.

Alternatively or additionally, the robot gardening tool is a grass-cutting robot.

According to another aspect of the present invention, a method for a robot gardening tool is provided. The method comprises: detecting at least one boundary element of a boundary module, the boundary module delimiting a work area and/or a non-work area of the robot gardening tool, and the at least one boundary element defining a periphery of the work area and/or the non-work area; generating a feedback signal $S_i$ based on the detection; and judging whether the robot gardening tool is jammed based on the feedback signal $S_i$.

Alternatively or additionally, the method further comprises: controlling the robot gardening tool to perform an extrication operation when the robot gardening tool is jammed.

Alternatively or additionally, the method further comprises: generating an excitation signal and sending the excitation signal to the at least one boundary element, wherein the boundary element comprises a boundary line which generates a boundary signal upon receiving the excitation signal, the boundary signal for example being an electromagnetic field.

Alternatively or additionally, the method further comprises at least one of the following: generating the feedback signal $S_i$ when the strength of a boundary signal is greater than a strength threshold; and generating the feedback signal $S_i$ when the robot gardening tool collides with at least one boundary.

Alternatively or additionally, the method further comprises: recording a time of occurrence $t_i$ of each feedback signal $S_i$; calculating a time interval $\Delta t_i$ between two consecutive feedback signals $S_i$ and $S_{i+1}$; and judging whether the robot gardening tool is jammed based on the time interval $\Delta t_i$.

Alternatively or additionally, the method further comprises: determining that the robot gardening tool is jammed when the time interval $\Delta t_i$ is less than a time threshold.

Alternatively or additionally, the method further comprises: determining that the robot gardening tool is jammed when n consecutive time intervals $\Delta t_i$, $\Delta t_{i+1}$ . . . $\Delta t_{i+n-1}$ are all less than a time threshold, wherein n is selected from one of 2-10.

Alternatively or additionally, the method further comprises: determining that the robot gardening tool is jammed when m time intervals of n consecutive time intervals $\Delta t_i$, $\Delta t_{i+1}$ . . . $\Delta t_{i+n-1}$ are all less than a time threshold, wherein n is selected from one of 2-10, m is selected from one of 2-9, and m<n.

Alternatively or additionally, the method further comprises: recording a trajectory of advance of the robot gardening tool; and causing the robot gardening tool to retreat along the recorded trajectory of advance for a predetermined time or a predetermined distance, and preferably then turn aside through a predetermined angle, wherein preferably, the predetermined time is a random time, and the predetermined angle is a random angle.

Alternatively or additionally, the method further comprises: issuing an alert to a user when jamming of the robot gardening tool is detected again within a period of time after completion of the extrication operation.

The robot gardening tool system and method for a robot gardening tool according to one or more embodiments of the present invention have a number of technical advantages. For example, the robot gardening tool according to one or more embodiments of the present invention can conveniently detect whether jamming has occurred, and if jamming has occurred, can effectively extricate itself from the jammed state. For example, the robot gardening tool according to one or more embodiments of the present invention can avoid misjudgements concerning a jammed state, and can perform more effective operations on work areas where jamming is likely. As another example, the method for a robot gardening tool according to one or more embodiments of the present invention has a simple, unique and effective design, and is suitable for detecting jamming in various areas where jamming is likely in work areas.

More embodiments and beneficial technical effects of the present invention will be described in detail below.

DETAILED DESCRIPTION OF EMBODIMENTS

In order to facilitate understanding of the present invention, a number of exemplary embodiments will be described below with reference to related drawings.

Figure 1A:
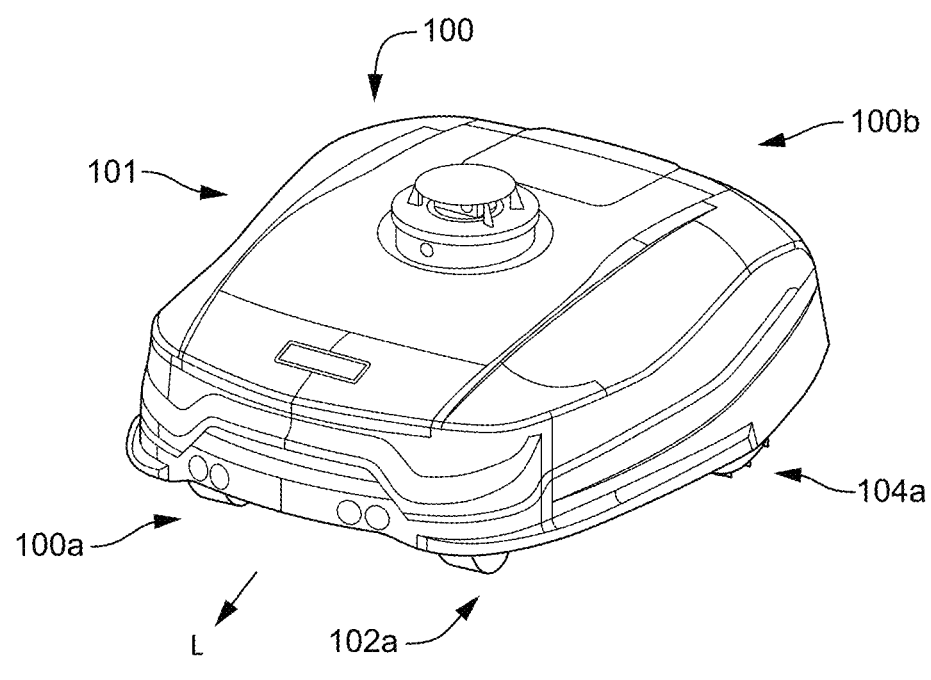
FIG. 1A shows a schematic drawing of a robot gardening tool according to embodiments of the present invention.
Figure 1B:
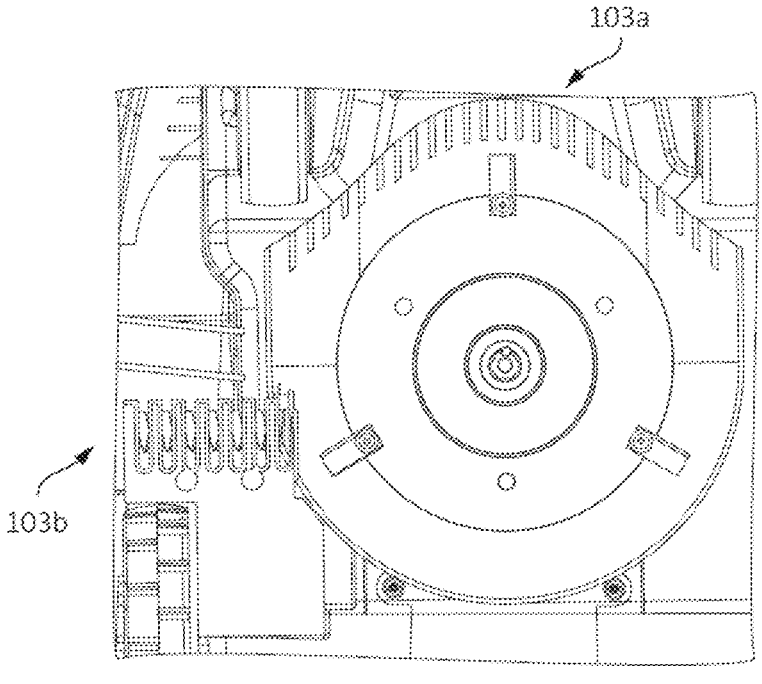
FIG. 1B shows a bottom view of part of the robot gardening tool in FIG. 1A.
Figure 1C:
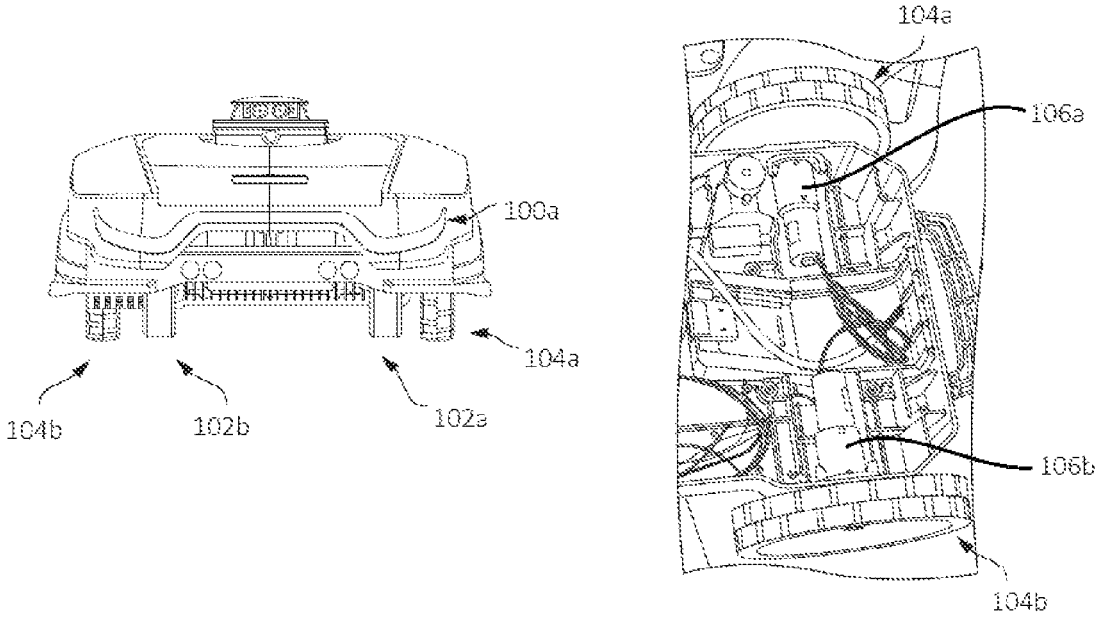
FIG. 1C shows other views of the robot gardening tool in FIG. 1A.

According to one aspect of the present invention, FIGS. 1A-1C show schematic drawings of a robot gardening tool 100 according to embodiments of the present invention. The robot gardening tool 100 may be a gardening tool that is capable of moving physically and performing an operation on a garden in a specific area on its own, without the need for manual intervention. In one or more embodiments, the robot gardening tool 100 is for example a grass-cutting robot capable of trimming a lawn.

In some embodiments, as shown in the figures, the robot gardening tool 100 comprises a housing 101 and at least one operating tool (e.g. a grass-cutting tool) 103a, 103b disposed on the housing 101. The robot gardening tool 100 has a first end or front end 100a, a second end or rear end 100b, and a longitudinal axis or axis L extending through the first end 100a and second end 100b.

The robot gardening tool 100 comprises a travelling apparatus and a motive power apparatus. The travelling apparatus is configured to facilitate travel of the robot gardening tool 100 on a physical surface in a specific direction. As an example, the travelling apparatus comprises front rollers 102a, 102b disposed close to the first end 100a, and rear rollers 104a, 104b disposed close to the second end 100b.

The motive power apparatus is configured to drive the travelling apparatus. The motive power apparatus may comprise a suitable motive power source. As an example, the motive power apparatus comprises motors 106a and 106b. The motive power apparatus may drive the travelling apparatus in a suitable way. In this embodiment, the front rollers 102a, 102b are driven wheels or casters of a smaller size, while the rear rollers 104a, 104b are drive wheels of a larger size. The rear roller 104a is driven independently by the motor 106a; the rear roller 104b is driven independently by the motor 106b. The front rollers 102a, 102b are not driven directly by the motors 106a and 106b. In some embodiments, the front rollers 102a, 102b are further attached to a frame or chassis of the robot gardening tool 100 in such a way as to be pivotable about corresponding pivot axes, wherein, when the robot gardening tool is operating on horizontal ground, the corresponding pivot axes are substantially perpendicular to the ground. The front rollers 102*a*, 102*b* can pivot freely about their corresponding pivot axes, such that the rolling direction of the rollers can follow the direction in which the robot gardening tool 100 is advancing.

The above are merely examples of the design of the travelling apparatus and motive power apparatus. In other embodiments, the travelling apparatus and motive power apparatus may be designed in other suitable ways according to actual needs. For example, the travelling apparatus may comprise less than four or more than four rollers, wherein one or more or all of the rollers may be driven directly by the motive power apparatus.

In this embodiment, generally, when the robot gardening tool 100 is advancing in the direction of axis L shown in FIG. 1A, this can be referred to as advancing in a forward direction or forward progress; when the robot gardening tool is advancing in the direction opposite to the direction of axis L, this can be referred to as advancing in a backward direction or retreating.

Figure 2:
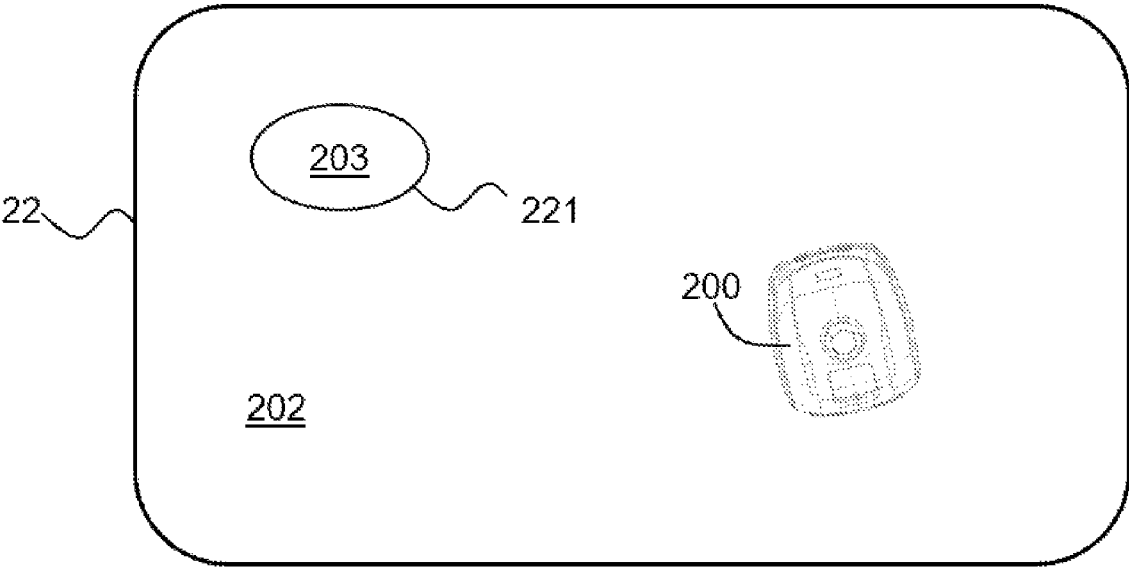
FIG. 2 shows a robot gardening tool and a work area thereof according to embodiments of the present invention.

FIG. 2 shows a robot gardening tool and a work area thereof according to embodiments of the present invention. The robot gardening tool 200 may for example be the robot gardening tool 100 illustrated in FIGS. 1A-1C.

As shown in the figure, a boundary 22 defines the work area 202; a part other than the work area 202 is a non-work area. It is desired that the robot gardening tool 200 work in the work area 202, e.g. trim a lawn therein. The boundary 22 is merely schematic. In reality, the contour of the boundary 22 may be more complex and irregular. In addition, a non-work area 203 defined by one or more secondary boundary 221 may be included in the work area 202 defined by one main boundary 22. In other words, the main boundary 22 and the secondary boundary 221 together define the work area 202 therebetween.

The boundaries 22, 221 may be defined by one or more boundary element. The boundaries 22, 221 may be virtual boundaries. In some embodiments, the boundary element comprises a boundary line capable of generating a boundary signal. The boundary line may be configured to be exposed at the ground surface, or buried at a certain depth underground, or have some parts exposed and other parts buried. The boundary line may carry an electric or magnetic signal, and generates an electromagnetic field around it, thereby being used to define the boundary. In some embodiments, the boundary element comprises at least one beacon capable of generating a boundary signal, the at least one beacon generating an electric signal or magnetic signal to mark an area adjacent thereto as a non-work area for example. In some embodiments, the boundary element comprises a virtual position signal marked in a virtual map; the virtual map may for example be drawn with the aid of a satellite or in another way, and the virtual position signal may be generated manually or by automatic recognition and loaded into the virtual map. Other forms of virtual boundary element are also possible, as long as they can define a work area and/or a non-work area.

The boundaries 22, 211 may also be substantive boundaries, e.g. physical boundaries. In some embodiments, the boundary element for example comprises a fence or wall. These physical boundary elements prevent the robot gardening tool 200 from passing. Other forms of substantive boundary element are also possible.

Figures 3, 4:
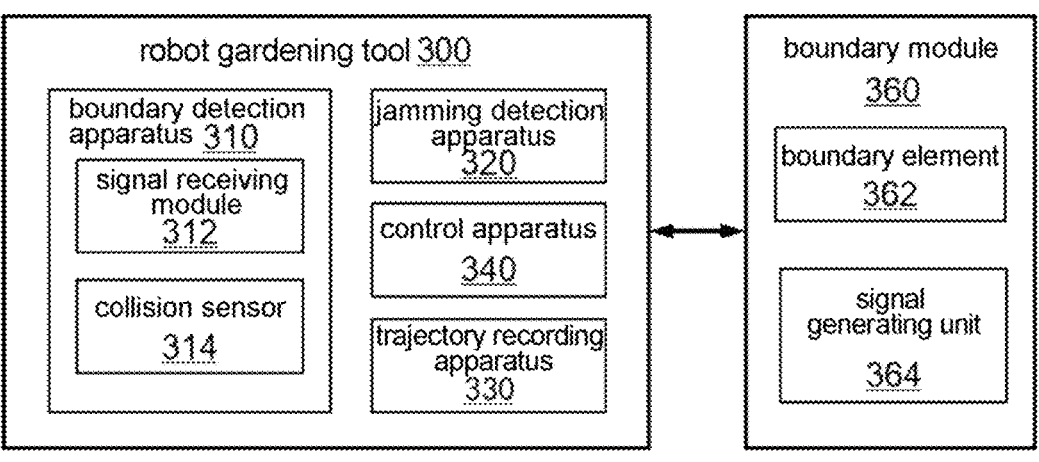
FIG. 3 shows a modular block diagram of the robot gardening tool system according to embodiments of the present invention.
FIG. 4 shows a robot gardening tool in a work area, and detection of jamming thereof, according to embodiments of the present invention.

FIG. 3 shows a modular block diagram of the robot gardening tool system according to embodiments of the present invention.

As shown, the robot gardening tool system comprises a robot gardening tool 300 and a boundary module 360. The robot gardening tool 300 may for example be the robot gardening tool 100 illustrated in FIGS. 1A-1C or the robot gardening tool 200 illustrated in FIG. 2.

The boundary module 360 delimits a work area and/or a non-work area of the robot gardening tool 300. The boundary module 360 comprises at least one boundary element 362, the boundary element 362 defining a periphery or boundary of the work area and/or non-work area. As stated above, the boundary may be a physical boundary (e.g. a fence, wall, etc.), or a virtual boundary, e.g. a boundary delimited by a boundary line or beacon or with the aid of a satellite apparatus.

In some embodiments, the boundary module 360 further comprises a signal generating unit 364, e.g. a signal generator. The signal generating unit 364 can generate an excitation signal and send the excitation signal to the boundary element 362. For example, in some embodiments, the boundary element comprises a boundary line. The signal generating unit generates a current as an excitation signal, and the current flows through the boundary line, generating an electromagnetic field as a boundary signal. The electromagnetic field signal is stronger along the boundary line and weaker far away from the boundary line. By detecting the strength of the electromagnetic field signal, the robot gardening tool can determine how far away it is from the boundary of the work area. That is, the boundary line carrying the electromagnetic field signal delimits the periphery or boundary of the work area or non-work area of the robot gardening tool. Different boundary elements can generate different boundary signals, to distinguish between the work area and non-work area.

The robot gardening tool 300 comprises a boundary detection apparatus 310, a jamming detection apparatus 320 and a control apparatus 340. These apparatuses may be provided separately or integrated in the same circuit module.

The boundary detection apparatus 310 can detect the boundary element 362. In some embodiments, the boundary is configured as a virtual boundary, e.g. a boundary line, a beacon, a boundary delimited with the aid of a satellite apparatus, etc. The boundary detection apparatus 310 may for example comprise a signal receiving module 312. The signal receiving module 312 for example comprises one or more sensor disposed on the frame or chassis of the robot gardening tool 300 or at another suitable position. In some embodiments, the signal receiving module 312 is an electromagnetic signal sensor capable of sensing the boundary signal generated by the boundary module 360. When the strength of the boundary signal (e.g. magnetic field signal) sensed by the signal receiving module 312 is greater than a strength threshold (e.g. a predetermined magnetic field strength), the boundary detection apparatus 310 generates or issues a feedback signal $S_j$. In some embodiments, the signal receiving module 312 is a position sensor capable of detecting and judging a distance to the virtual boundary. When the distance is less than a distance threshold, the boundary detection apparatus 310 generates or issues a feedback signal $S_j$. The sensing of the boundary by the signal receiving module 312 does not require the robot gardening tool 300 to necessarily come into physical contact with part of the boundary module 360 (e.g. the boundary element 362) or overlap the boundary physically, but of course, physical contact or overlap with part thereof is not ruled out.

In some embodiments, the boundary is configured as a physical boundary, e.g. a wall, fence, etc. The boundary detection apparatus 310 further comprises a collision sensor 314, e.g. an accelerometer. When the collision sensor 314 senses that part of the robot gardening tool 300 (e.g. the front end) has collided with the boundary, the boundary detection apparatus 310 issues a feedback signal $S_i$.

In some embodiments, the feedback signal $S_i$ generated or issued by the boundary detection apparatus 310 is a continuous signal, not a discrete signal. The continuous signal comprises a part that exceeds a threshold and a part that is lower than a threshold.

The jamming detection apparatus communicates with the boundary detection apparatus 310. The inventors of the present invention first realized that it is possible to detect and judge whether the robot gardening tool 300 is jammed based on the pattern of the feedback signal $S_i$ generated by the boundary detection apparatus 310. This method of detection and judgement does not require additional sensors or equipment to be provided for the robot gardening tool 300; it only needs to rely on an existing electromagnetic signal sensor, position sensor or acceleration sensor. Thus, the present invention enables detection and judgement of whether the robot gardening tool 300 is jammed, in a low-cost and reliable way.

In some embodiments, upon receiving each feedback signal $S_i$, the jamming detection apparatus 320 records the time of occurrence $t_i$ of the feedback signal $S_i$. The jamming detection apparatus 320 calculates the time interval $\Delta t_i$ between two consecutive feedback signals $S_i$ and $S_{i+1}$, and judges whether the robot gardening tool 300 is jammed based on the time interval $\Delta t_i$. Alternatively, the jamming detection apparatus 320 does not record the absolute time of occurrence $t_i$ of the feedback signal $S_i$, instead merely recording the relative time interval $\Delta t_i$ between two consecutive feedback signals $S_i$ and $S_{i+1}$. For example, in some embodiments, when the time interval $\Delta t_i$ is less than a time threshold, the jamming detection apparatus 320 determines that the robot gardening tool 300 is jammed. In other embodiments, when n consecutive time intervals $\Delta t_i$, $\Delta t_{i+1}$ . . . $\Delta t_{i+n-1}$ are all less than a time threshold, the jamming detection apparatus 320 determines that the robot gardening tool 300 is jammed. For example, n is selected from one of 2-10, e.g. 2, 3, 4, 5, 6, 7, 8, 9, 10. In other embodiments, when m time intervals of n consecutive time intervals $\Delta t_i$, $\Delta t_{i+1}$ . . . $\Delta t_{i+n-1}$ are all less than a time threshold, the jamming detection apparatus 320 determines that the robot gardening tool 300 is jammed. For example, n is selected from one of 2-10, e.g. 2, 3, 4, 5, 6, 7, 8, 9, 10, m is selected from one of 2-9, e.g. 2, 3, 4, 5, 6, 7, 8, 9, and m<n. The time threshold may for example be selectively set by the user or set in advance according to factors such as the speed of advance of the robot gardening tool 300, the size of the work area, etc. In some embodiments, the time threshold may be 5-120 seconds, 10-90 seconds, 20-60 seconds, 30 seconds, etc.

In the case where the feedback signal $S_i$ is a continuous signal rather than a discrete signal, those skilled in the art will know, based on the description herein, how the robot gardening tool should be configured to process the continuous signal. For example, the jamming detection apparatus 320 receives the continuous feedback signal $S_i$, and records each time $t_i$ when the feedback signal $S_i$ exceeds a threshold. No further details are described here.

When the jamming detection apparatus 320 determines that the robot gardening tool 300 is jammed, it communicates with the control apparatus 340. When the robot gardening tool 300 is jammed, the control apparatus 340 controls the robot gardening tool 300 to perform an extrication operation. The extrication operation may be one or more of predetermined operations, e.g. retreat, turning, or travelling along a specific route, etc. In some embodiments, the robot gardening tool further comprises a trajectory recording apparatus 330. The trajectory recording apparatus 330 can record a trajectory of advance of the robot gardening tool 300. The trajectory of advance may for example be characterized as a motion trajectory obtained on the basis of satellite navigation, or as an operating state of the motive power apparatus within a period of time. The extrication operation for example comprises causing the robot gardening tool 300 to retreat along the recorded trajectory of advance for a predetermined time (e.g. 10-180 seconds, 30-150 seconds, 60-120 seconds, etc.) or a predetermined distance (e.g. 0.5-20 metres, 1-15 metres, 2-10 metres, 5 metres, etc.), and optionally, turn aside through a predetermined angle (e.g. 10-180 degrees, 20-150 degrees, 30-90 degrees, 60 degrees, etc.) before continuing to advance. In some embodiments, the extrication operation comprises causing the robot gardening tool 300 to advance along at least one boundary element (e.g. boundary line) for a predetermined time (e.g. 10-180 seconds, 30-150 seconds, 60-120 seconds, etc.) or a predetermined distance (e.g. 0.5-20 metres, 1-15 metres, 2-10 metres, 5 metres, etc.), and optionally, turn aside through a predetermined angle (e.g. 10-180 degrees, 20-150 degrees, 30-90 degrees, 60 degrees, etc.) before continuing to advance. In some embodiments, the predetermined time mentioned above may be a random time, the predetermined distance mentioned above may be a random distance, and the predetermined angle mentioned above may be a random angle.

In some embodiments, the control apparatus 340 further comprises an alarm apparatus, e.g. a sound alarm. If jamming of the robot gardening tool 300 is detected again within a period of time (e.g. 30-180 seconds, 60-120 seconds, etc.) after completion of the extrication operation, an alert is issued to the user, to alert the user to deal with the situation. This is advantageous in some cases. In general, once the robot gardening tool has extricated itself from the jam, if it becomes jammed again within a specific time, this might indicate that self-extrication is more difficult in the area in question, so assistance by manual intervention can be sought, e.g. a person can go and shift the robot gardening tool.

FIG. 4 shows a robot gardening tool in a work area, and detection of whether it is jammed in the work area, according to embodiments of the present invention. The robot gardening tool 400 may for example be the robot gardening tool 100 illustrated in FIGS. 1A-1C or the robot gardening tool 200 illustrated in FIG. 2 or the robot gardening tool 300 illustrated in FIG. 3.

As illustrated, the boundary module comprises a boundary line 42 and a signal generating unit 44. The signal generating unit 44 is for example a current generator that generates an excitation current (an example of an excitation signal). The boundary line 42 is for example a conductive wire carrying the excitation current; the conductive wire receives the excitation current and generates a boundary signal. The boundary line 42 delimits the boundary of a work area 402. Although the signal generating unit 44 is illustrated as being located on the boundary, this is not necessary. In some embodiments, the signal generating unit 44 may be located outside or inside the boundary, and then electrically connected to the boundary line 42.

The boundary signal may be of a suitable type, for example being a signal having a specific frequency and a specific waveform (e.g. a sine wave, a cosine wave, a square wave, etc., or a superimposition of one or more waveforms). The boundary signal may be the alternating occurrence or superimposition of an emitted signal emitted by the signal generating unit 44 and an auxiliary signal. The boundary signal may also be a periodic or non-periodic signal appearing through the alternating occurrence of an emitted signal emitted by the signal generating unit 44 and a vacant signal. The boundary signal may also be a signal whose signal period and/or phase changes with time. The boundary signal may also be the alternating occurrence or superimposition of one or more different emitted signals. The robot gardening tool 400 may subject the boundary signal to processing, such as amplification, filtering or phase modulation.

For example, in some embodiments, at a frequency of 53 Hz, the boundary line 42 emits 4 slot square wave signals (1, 1, −1, 1), which are immediately followed by 279 empty slots. The robot gardening tool continuously detects the signal, capturing the signal once every 300 time slots, and filters the signal to detect whether where is a boundary signal and the strength and phase of the boundary signal.

There might be an undesirable object in the work area 402, e.g. one or more trees 401, one or more obstacles of another type (e.g. rock piles) 403, etc. The boundary module may also comprise boundary elements delimiting the boundaries of these undesirable objects; in this embodiment, these boundary elements are illustrated as boundary lines 42a and 42b. In addition, the work area 402 also contains regions which are likely to cause jamming of the robot gardening tool 400, e.g. an area 405 between the tree 401 and the obstacle 403, a first corner area 407, and a second corner area 409, etc.

An existing system is often unable to detect an obstacle present in a work area, or if the machine becomes jammed, needs to wait for a person to go and deal with the jam, and this is disadvantageous. To solve these problems, FIG. 4 illustrates judgement and processing for jamming of the robot gardening tool 400 in the second corner area 409. As shown, it is illustrated that in response to the robot gardening tool 400 advancing to position p1 in direction a (indicated by an arrow, likewise hereinbelow), the boundary detection apparatus of the robot gardening tool 400 issues a feedback signal $S_1$, and the jamming detection apparatus thereof receives the feedback signal $S_1$ and records the time $t_1$. The triggering of the feedback signal $S_1$ may be due to the boundary signal (a magnetic field signal in this embodiment) sensed by the robot gardening tool being greater than a strength threshold (a predetermined magnetic field strength in this embodiment), or may be due to the robot gardening tool sensing that it has collided with or overlapped the boundary line 42. In addition, it must also be understood that although position p1 is illustrated as being located on the boundary delimited by the boundary line 42, this is not necessary; position p1 might be located at a certain distance from the boundary at the inner side thereof, as long as the boundary signal sensed by the robot gardening tool as this distance attains a certain value. This similarly applies to position p2 and position p3 which will be illustrated below.

After reaching position p1, the robot gardening tool 400 may advance in direction b according to a set plan. For example, the robot gardening tool 400 may turn through a certain angle, or first retreat for a certain distance or time and then turn through a certain angle, and then advance in direction b. When the robot gardening tool 400 advances to position p2, the boundary detection apparatus of the robot gardening tool 400 issues a feedback signal $S_2$, and the jamming detection apparatus thereof receives the feedback signal $S_2$ and records the time $t_2$, and calculates the time difference $\Delta t_1 = (t_2 - t_1)$ during which the robot gardening tool 400 advanced from position p1 to position p2. The trigger conditions for feedback signal $S_2$ may be similar to those for feedback signal $S_1$, or may be slightly different.

After reaching position p2, the robot gardening tool 400 may advance in direction c according to a set plan. When the robot gardening tool 400 advances to position p3, the boundary detection apparatus of the robot gardening tool 400 issues a feedback signal $S_3$, and the jamming detection apparatus thereof receives the feedback signal $S_3$ and records the time $t_3$, and calculates the time difference $\Delta t_2 = (t_3 - t_2)$ during which the robot gardening tool 400 advances from position p2 to position p3. The trigger conditions for feedback signal $S_3$ may be similar to those for feedback signal $S_1$, or may be slightly different.

In this embodiment, when $\Delta t_1$ and $\Delta t_2$ are both less than a time threshold (e.g. 60 seconds), the jamming detection apparatus of the robot gardening tool 400 determines that the robot gardening tool 400 is jammed, and the control apparatus thereof then instructs the robot gardening tool 400 to advance for a predetermined time or a predetermined distance along a predetermined route or direction (in this embodiment, in direction e which coincides with the boundary) to reach position p4, thereby extricating itself from the jammed state. At position p4, the robot gardening tool 400 turns through a certain angle towards the work area 402 (this angle might be predetermined, e.g. 30 degrees, or may be randomly generated), and the continues to advance to perform normal work.

If at least one of $\Delta t_1$ and $\Delta t_2$ is greater than or equal to a time threshold (e.g. 60 seconds), the jamming detection apparatus of the robot gardening tool 400 determines that the robot gardening tool 400 is not jammed. At position p3, the robot gardening tool 400 will for example advance in direction d and continue to perform normal work.

In some embodiments, when $\Delta t_1$ is less than a time threshold, the jamming detection apparatus of the robot gardening tool 400 determines that the robot gardening tool 400 is jammed, and then begins an extrication operation at position p2.

FIG. 4 only illustrates the generation of trigger signals at three positions (position p1, position p2, position p3). In some embodiments, trigger signals might be generated at more positions, e.g. 5 positions, 10 positions or 15 positions. For example, in some embodiments, the robot gardening tool might only be determined as being jammed when 5, 8 or even more consecutive time intervals are all less than a time threshold. This is advantageous in some cases. For example, misjudgements can be reduced. In some cases, for example, it is set in advance that it will only be determined that the robot gardening tool has become jammed if 7 consecutive time intervals are all less than a time threshold, and the robot gardening tool might have extricated itself on its own from an area where jamming is likely after the previous 6 consecutive time intervals were all less than a time threshold. This also indicates that in such circumstances, manual intervention might not be needed, because the robot gardening tool can extricate itself from the jammed state on its own after self-adjustment. If the number of time intervals less than a time threshold is set too small, it will be determined as being in a jammed state, and the robot gardening tool will then activate an extrication operation and leave the area where it is located, no longer performing an operation on the area where it is located, and may even introduce manual intervention which is actually not necessary. That is, setting multiple consecutive time intervals to all satisfy the determination condition of being less than a time threshold can encourage the robot gardening tool to work for as long a time as possible in an area where jamming is likely, and this is conducive to performing a better operation on such an area (e.g. removing more grass).

In addition, the predetermined angle, predetermined time and predetermined distance mentioned in conjunction with FIG. 4 may be set in advance or randomly generated. In some cases, it is advantageous to use an angle, time and distance that are randomly generated. Taking as an example the advance of the robot gardening tool from position p3 to position p4 in direction e, due to the fact that the time or distance of advance is randomly generated, position p4 is thus random, and this is advantageous for the robot gardening tool advancing towards the work area from different positions on the boundary; consequently, the object of the operation (e.g. lawn) in the work area can undergo a more uniform operation. The robot gardening tool turning through a random angle at position p4 also promotes this beneficial result.

Figure 5:
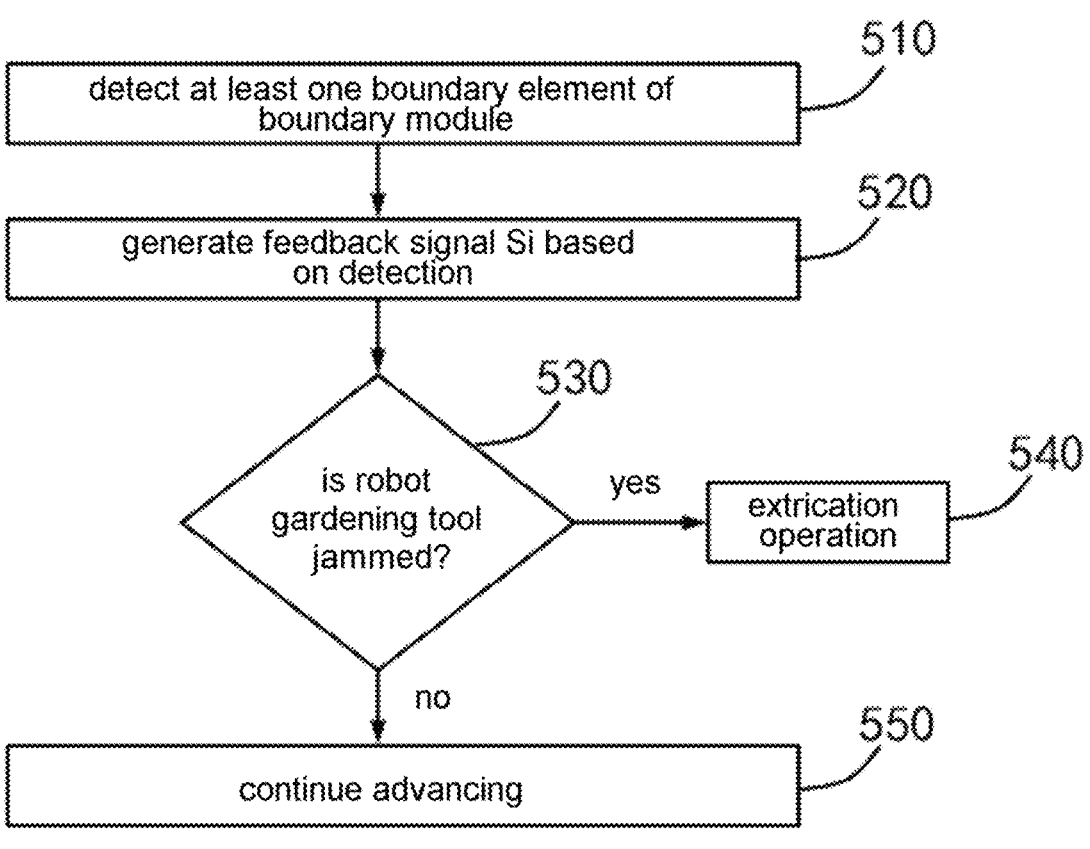
FIG. 5 shows a method for a robot gardening tool in embodiments of the present invention.

FIG. 5 shows a method for a robot gardening tool in embodiments of the present invention. The method may for example be performed by the robot gardening tool 100 illustrated in FIGS. 1A-1C or the robot gardening tool 200 illustrated in FIG. 2 or the robot gardening tool 300 illustrated in FIG. 3 or the robot gardening tool 400 illustrated in FIG. 4.

As shown, in box 510, at least one boundary element of a boundary module is detected. For example, a sensor of the robot gardening tool may detect an electromagnetic field generated by a boundary line carrying an electric signal, or detect a boundary signal created by a suitable signal source such as a beacon or satellite apparatus.

In box 520, based on the detection, a feedback signal $S_i$ is generated. The generation of the feedback signal $S_i$ is based on a predetermined trigger condition (e.g. a detected boundary signal reaching a certain threshold, or a collision or overlap occurring with a boundary element or boundary, etc.), and indicates that the robot gardening tool has already entered a predetermined boundary area. The predetermined boundary area may be where the distance to the boundary is less than a predetermined value, or overlap occurs (e.g. the front end of the robot gardening tool touches or overlaps the boundary).

In box 530, a judgement is made as to whether the robot gardening tool has become jammed. This may for example be determined by means of the system or method illustrated in conjunction with FIG. 3 or 4, although other determination methods are also possible. If it is determined that jamming has occurred, the flow proceeds to box 540, and an extrication operation is performed. The extrication operation may be causing the robot gardening tool to retreat or advance for a predetermined time or a predetermined distance in a predetermined direction or along a predetermined route, and optionally, to then turn aside through a predetermined angle. If it is determined in box 530 that jamming has not occurred, the flow proceeds to box 550, and the robot gardening tool continues to advance.

Figure 6:
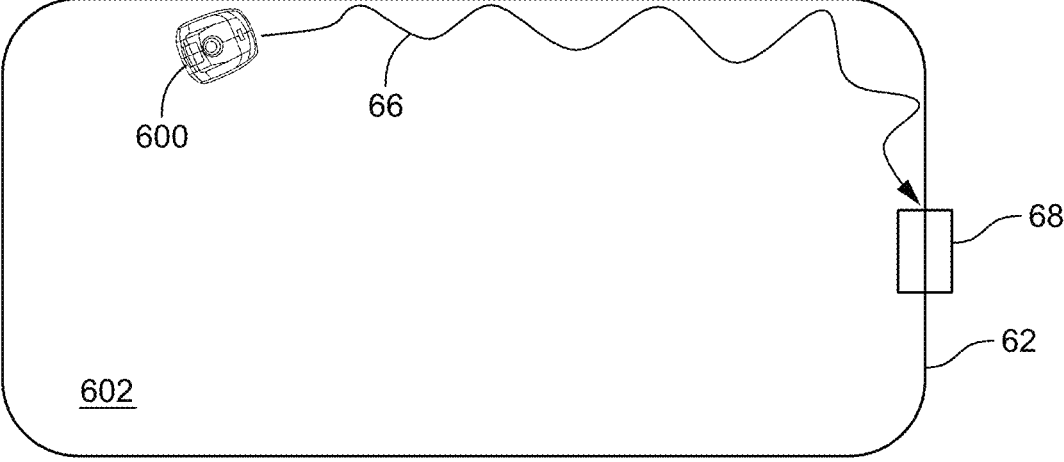
FIG. 6 shows a return route of a robot gardening tool according to embodiments of the present invention.

FIG. 6 shows a return route of a robot gardening tool according to embodiments of the present invention. As shown, a boundary line 62 defines a work area 602. The robot gardening tool 600 can work in the work area 602. FIG. 6 also shows a charging station 68; the charging station 68 may comprise a signal generating unit for generating a signal (not shown).

When the charge level of a battery of the robot gardening tool 600 is lower than a certain level, the robot gardening tool 600 needs to return to the charging station 68 to charge. In some embodiments, when it needs to charge, the robot gardening tool 600 will return to the charging station 68 along the boundary line 62 (a first return route).

In some embodiments, when it needs to charge, the robot gardening tool 600 will return to the charging station 68 along a second return route different from the first return route. The second return route may comprise a route that deviates from the boundary line by a predetermined distance, or may be a curved route that deviates from the boundary line by a varying distance, or a combination thereof. The second return route may be a combination of the abovementioned routes having several different trajectories. When each return operation takes place, the robot gardening tool 600 thereby or randomly selects one of the routes. The second return route may also be a random route. As an example, FIG. 6 shows one of the routes: second return route 66.

In some cases, it is advantageous to use the second return route. For example, this can avoid excessive destruction of or damage to the grass on this same route caused by the robot gardening tool returning along the boundary line every time. In ground surface environments with higher humidity, the destruction caused by the robot gardening tool along a fixed route might be significant. The second return route shown in FIG. 6 can avoid or mitigate such disadvantages.

The second return route may be set in advance. In other embodiments, the second return route is randomly generated. The randomly generated second return route can further mitigate the destruction or damage caused to the work area.

Those skilled in the art should understand that the embodiments herein are only for the purpose of exemplifying the present invention, and are by no means limiting the present invention. For example, the drawings are merely illustrative, and the key elements therein are not necessarily shown according to actual proportions. One drawing might show multiple key elements. Those skilled in the art should understand that this is only for the purpose of simplicity and does not mean that each element is necessary. Those skilled in the art will understand that one or more elements in the same figure may be optional or additional elements.

Those skilled in the art should also understand that the above embodiments attempt to illustrate one or more ideas of the present invention from different aspects, and they are not isolated; instead, those skilled in the art may combine different embodiments in an appropriate way according to the above examples to obtain other examples of the technical solution.

Unless otherwise defined, the technical and scientific terms used herein have the same meanings as commonly understood by those ordinarily skilled in the art of the present invention. The implementations of the present invention are illustrated in non-limiting embodiments. Various variations that can be conceived by those skilled in the art on the basis of the embodiments disclosed above shall fall within the scope of the present invention.

The invention claimed is:

1. A robot gardening tool system, comprising:
   a robot gardening tool;
   a boundary module delimiting a work area and/or a non-work area of the robot gardening tool, the boundary module comprising at least one boundary element defining a periphery of the work area and/or the non-work area,
   wherein the robot gardening tool comprises:
      a boundary detection apparatus configured to detect the at least one boundary element;

a jamming detection apparatus which communicates with the boundary detection apparatus, wherein the jamming detection apparatus receives a feedback signal $S_i$, records a time of occurrence $t_i$ of each feedback signal $S_i$, and calculates a time interval $\Delta t_i$ between two consecutive feedback signals $S_i$ and $S_{i+1}$, and wherein the jamming detection apparatus determines that the robot gardening tool is jammed when n consecutive time intervals $\Delta t_i$, $\Delta t_{i+1}$ . . . $\Delta t_{i+n-1}$ are all less than a time threshold, wherein n is selected from one of 2-10; and a control apparatus configured to control the robot gardening tool to perform an extrication operation when the robot gardening tool is jammed.

2. The robot gardening tool system as claimed in claim 1, wherein the boundary module comprises a signal generating unit which generates an excitation signal and sends the excitation signal to the at least one boundary element, and the boundary element comprises a boundary line which generates a boundary signal upon receiving the excitation signal.

3. The robot gardening tool system as claimed in claim 2, wherein the boundary detection apparatus comprises a signal receiving module for sensing the boundary signal, and the boundary detection apparatus issues the feedback signal $S_i$ when the strength of the boundary signal sensed by the signal receiving module is greater than a strength threshold.

4. The robot gardening tool system as claimed in claim 1, wherein at least one boundary element comprises a physical boundary.

5. The robot gardening tool system as claimed in claim 4, wherein the boundary detection apparatus comprises a collision sensor, and the boundary detection apparatus issues the feedback signal $S_i$ when the collision sensor senses that the robot gardening tool has collided with the at least one boundary.

6. The robot gardening tool system as claimed in claim 1, wherein the jamming detection apparatus further determines that the robot gardening tool is jammed when the time interval $\Delta t_i$ is less than a time threshold.

7. The robot gardening tool system as claimed in claim 1, wherein the robot gardening tool further comprises a trajectory recording apparatus, which records a trajectory of advance of the robot gardening tool, and the extrication operation comprises causing the robot gardening tool to retreat along the recorded trajectory of advance for a predetermined time or a predetermined distance.

8. The robot gardening tool system as claimed in claim 7, wherein the predetermined time is a random time.

9. The robot gardening tool system as claimed in claim 7, wherein the extrication operation further comprises turning through a random predetermined angle.

10. The robot gardening tool system as claimed in claim 1, wherein the extrication operation comprises causing the robot gardening tool to advance along the at least one boundary element for a predetermined time or a predetermined distance, and then turn aside through a predetermined angle.

11. The robot gardening tool system as claimed in claim 1, wherein the control apparatus is configured to issue an alert to a user when jamming of the robot gardening tool is detected again within a period of time after completion of the extrication operation.

12. The robot gardening tool system as claimed in claim 1, wherein the robot gardening tool is a grass-cutting robot.

13. A method for a robot gardening tool, the method comprising:

detecting at least one boundary element of a boundary module, the boundary module delimiting a work area and/or a non-work area of the robot gardening tool, and the at least one boundary element defining a periphery of the work area and/or the non-work area;

generating a feedback signal $S_i$ based on the detection;

recording a time of occurrence $t_i$ of each feedback signal $S_i$;

calculating a time interval $\Delta t_i$ between two consecutive feedback signals $S_i$ and $S_{i+1}$; and determining that the robot gardening tool is jammed when n consecutive time intervals $\Delta t_i$, $\Delta t_{i+1}$ . . . $\Delta t_{i+n-1}$ are all less than a time threshold, wherein n is selected from one of 2-10.

14. The method as claimed in claim 13, further comprising: controlling the robot gardening tool to perform an extrication operation when the robot gardening tool is jammed.

15. The method as claimed in claim 14, further comprising issuing an alert to a user when jamming of the robot gardening tool is detected again within a period of time after completion of the extrication operation.

16. The method as claimed in claim 13, further comprising: generating an excitation signal and sending the excitation signal to the at least one boundary element, wherein the boundary element comprises a boundary line which generates a boundary signal upon receiving the excitation signal.

17. The method as claimed in claim 13, further comprising at least one of the following:

generating the feedback signal $S_i$ when the strength of a boundary signal is greater than a strength threshold; and generating the feedback signal $S_i$ when the robot gardening tool collides with at least one boundary.

18. The method as claimed in claim 13, further comprising determining that the robot gardening tool is jammed when the time interval $\Delta t_i$ is less than a time threshold.

19. The method as claimed in claim 13, further comprising:

recording a trajectory of advance of the robot gardening tool; and causing the robot gardening tool to retreat along the recorded trajectory of advance for a predetermined time or a predetermined distance.

20. A robot gardening tool system, comprising:

a robot gardening tool;

a boundary module delimiting a work area and/or a non-work area of the robot gardening tool, the boundary module comprising at least one boundary element defining a periphery of the work area and/or the non-work area, wherein the robot gardening tool comprises:

a boundary detection apparatus, configured to detect the at least one boundary element;

a jamming detection apparatus which communicates with the boundary detection apparatus, the jamming detection apparatus being configured to judge whether the robot gardening tool is jammed based on a feedback signal $S_i$ of the boundary detection apparatus;

a trajectory recording apparatus that records a trajectory of advance of the robot gardening tool; and a control apparatus configured to control the robot gardening tool to perform an extrication operation when the robot gardening tool is jammed, the extrication operation causing the robot gardening tool to retreat along the recorded trajectory of advance for a predetermined time or a predetermined distance, and then turning by a random angle.

* * * * *